US007551836B2

(12) United States Patent
Ono et al.

(10) Patent No.: US 7,551,836 B2
(45) Date of Patent: Jun. 23, 2009

(54) BROADCAST PROGRAM RECORDING METHOD, BROADCAST RECEIVER, AND INFORMATION RECORDER THEREFOR

(75) Inventors: Atsuhiro Ono, Kitaura (JP); Kazuto Shimagami, Mito (JP)

(73) Assignee: Hitachi, Ltd., Tokyo (JP)

( * ) Notice: Subject to any disclaimer, the term of this patent is extended or adjusted under 35 U.S.C. 154(b) by 709 days.

(21) Appl. No.: 11/177,689

(22) Filed: Jul. 7, 2005

(65) Prior Publication Data

US 2006/0045464 A1   Mar. 2, 2006

(30) Foreign Application Priority Data

Aug. 25, 2004   (JP)   ............................. 2004-244724

(51) Int. Cl.
*H04N 5/91* (2006.01)
(52) U.S. Cl. ............................. 386/83; 386/46; 386/125
(58) Field of Classification Search .................... 386/83, 386/46, 125
See application file for complete search history.

(56) References Cited

U.S. PATENT DOCUMENTS

2004/0136693 A1 *   7/2004   Iwasaki et al. ................. 386/95

FOREIGN PATENT DOCUMENTS

JP   2002-032975   1/2002

* cited by examiner

*Primary Examiner*—Thai Tran
*Assistant Examiner*—Girumsew Wendmagegn
(74) *Attorney, Agent, or Firm*—Townsend and Townsend and Crew LLP

(57) ABSTRACT

A highly-operable receiver, which shortens search operations on an HDD upon startup, a recording method thereof, and an information recorder therefor are described. The broadcast receiver includes a tuner portion for receiving a broadcast program, an MPEG decoder for converting a signal from the tuner portion to a predetermined format, and a hard disk drive (HDD) for recording the converted digital signal. Whether power was turned off normally at last use is determined when the power supply is turned on. If the power supply was turned off normally at last use, a bitmap for the HDD recorded upon the last power shut-off is input; if not, new bitmap information is created. Thus, the writing/reading operations of the HDD are better managed.

8 Claims, 4 Drawing Sheets

BROADCAST PROGRAM RECORDING METHOD, BROADCAST RECEIVER, AND INFORMATION RECORDER THEREFOR

BACKGROUND OF THE INVENTION

1. Field of the Invention

This invention relates to an apparatus and method for handling audio/video (AV) content transmitted by digital and analog broadcasting, and particularly to a broadcast receiver capable of easily recording a broadcast program on a self-contained information recording medium such as an HDD. The present invention also relates to a broadcast program recording method, and to an information recorder therefor.

2. Description of the Related Art

In recent years, in addition to conventional analog television broadcasting, digital television broadcasting has become widespread by broadcasting methods such as satellite broadcasting, satellite communication, and terrestrial broadcasting. A system for receiving various kinds of broadcasts for general household use is now widely available. Since the system can provide many more channels than those provided by conventional analog broadcasting, an extremely large number of programs can be broadcast. At the same time, for households to record and play the large number of broadcast programs, various AV machines such as digital video tape recorders and disk recorders have become commercially available.

Moreover, with increases in speed of information transmission (such as 20 Mbps), streaming video recorder/players are available and include large capacity information recording medium, such as a hard disk drive (HDD). Such recorders are capable of receiving multiple channels and can record audio/video streaming data on the HDD. JP-A-2002-32975 discloses the technology for a disk-shaped recording medium, which is a data writer for such a streaming player/recorder which can store data even after the machine shuts down due to a power failure.

Streaming data recorders generally search the storage status of data on vacant areas of the hard disk drive when the streaming player/recorder is turned on, to manage information writing/reading operations on the recording medium in an optimum manner. At that time, in the conventional technology, in writing information to the receiver on the HDD, audio/video streaming data is written in the HDD in 1980K-byte units, based on the Universal disk format (UDF) standard. Other data (such as program information) is written in sectors of 2K bytes. To manage how the information is recorded on the HDD, a UDF bitmap is created for each of the sectors, and bitmap information, known as AU bitmap is created for each 1980K-byte unit is written on the HDD.

To implement optimum management of an HDD on startup, the conventional technology described above searches the disk in sectors of 2K bytes and in units of 1980K bytes to check the data storage status and locate vacant areas of the HDD. The conventional technology always requires search operations for creating bitmap information for optimum HDD management on startup. Therefore, a relatively long time is required to complete the machine startup, resulting in slow machine startup, which is inconvenient for users.

BRIEF SUMMARY OF THE INVENTION

This overcomes the problems of the conventional technology, and provides a broadcast receiver that shortens search operations on machine startup and increases the speed of the startup. Thus it enhances the operability for users, and provides both a broadcast program recording method and information recorder therefor.

In one embodiment this system provides a broadcast program recording method for receiving and recording a broadcast program. The received program is recorded on an information recording medium. The method includes the steps of recording the received program information on the information recording medium, based on bitmap information; determining whether a power supply of the information recording medium was turned off normally the last time the information recording medium was powered on; and, based on the result of that determination, deciding whether to create bitmap information for the information recording medium.

The broadcast program recording method according to this aspect of the invention preferably further includes the step of inputting recorded bitmap information and performing an information recording operation if the power supply was turned off normally after the last use. The determination is made while the program creates bitmap information for the information recording medium. This aspect of the invention preferably further includes the steps of separating the broadcast program from the image information and data information thereof, and recording the image information and data information separately, in different areas on the information recording medium.

According to another aspect of the invention, there is provided a broadcast receiver including a tuner portion for receiving a broadcast program; a received signal converter portion for converting a signal from the tuner portion to a predetermined format; an information recording portion having an information recording medium for recording the signal converted by the received signal converter portion so that the broadcast receiver can record the received broadcast program in the information recording portion; and a power supply portion connected to a commercial power supply for supplying required power to components, including the information recording portion at least of the broadcast receiver, wherein the recording operation on the information recording medium of the information recording portion is controlled based on bitmap information, and, when the power supply is turned on, the information recording portion determines whether a power supply thereof was turned off normally after the last use. Based on the result of the determination, the information recording portion determines whether to create bitmap information for the information recording medium.

Furthermore, the invention provides an information recorder capable of recording a broadcast program, including a power supply portion connected to a commercial power supply for supplying required power to the information recorder, wherein the recording operation on a recording medium of the information recorder is controlled based on bitmap information, and, when the power supply portion is turned on, the information recorder determines whether the power supply portion thereof was turned off normally after the last use. Based on the determination, the information recorder decides whether to create bitmap information for the information recording medium.

In the broadcast receiver or information recorder according to this aspect of the invention, the information recording portion preferably further inputs recorded bitmap information and performs an information recording operation if the power supply was turned off normally after the last use. At the same time, the information recording portion creates bitmap information for the information recording medium if the power supply was not turned off normally. The information recording portion preferably includes a hard disk on which the broadcast program image information and data information are stored in separate regions.

As described above, using the method and apparatuses of the invention, an initializing operation including a search for a required information recording medium can be performed efficiently and quickly upon start up, so that the writing/reading operations on the broadcast receiver can be optimally managed. Thus, a broadcast receiver, which is highly operable for users, can be advantageously provided.

DESCRIPTION OF THE PREFERRED EMBODIMENTS

Figure 3:
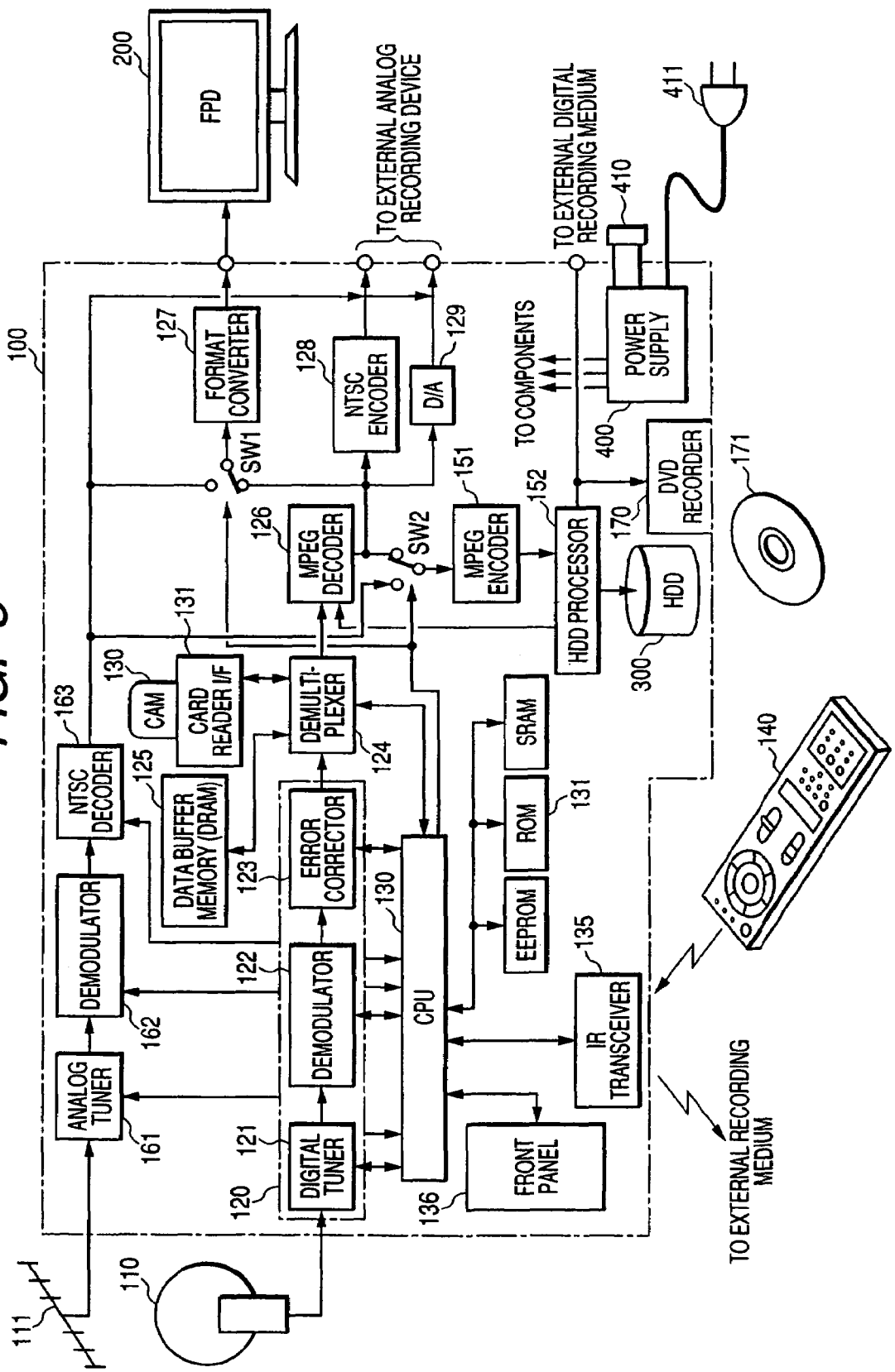
FIG. 3 is a block diagram showing an internal configuration of the broadcast receiver.

Exemplary embodiments of the invention are described below with reference to attached drawings. FIG. 3 is a block diagram showing an exemplary configuration of a broadcast receiver internally containing an information recorder according to an embodiment of the invention. FIG. 3 includes an audio/video (AV) broadcast receiver 100 for receiving digital and analog broadcasts and displaying the broadcast contents (including a audio/video AV programs, data-broadcast programs and data-broadcast data) on a flat panel display (FPD) 200 such as a plasma screen display panel or a liquid crystal display panel.

FIG. 3 further includes a parabola antenna 110 for receiving a digital broadcast. An RF signal from antenna 110 is supplied to and demodulated in a digital tuner 121 included in a digital tuner module (or front end) 120 in digital broadcast receiver 100. The output of digital tuner 121 is supplied to a QPSK demodulator circuit 122, for example, also included in tuner module 120 and undergoes QPSK demodulation there. The output of QPSK demodulator circuit 122 is conveyed to an error corrector circuit 123, also included in tuner module 120, where errors occurring during the transmission are detected and corrected. Namely, tuner module 120 selects a signal at a chosen frequency and extracts a transport streaming (TS).

A demultiplexer 124 inputs the signal output from error corrector circuit 123 of digital tuner module 120, stores the signal in a dynamic random access memory (DRAM) or a static random access memory (SRAM) data buffer memory 125 loads and decrypts this as required, and supplies the decrypted audio/video (AV) signal to an MPEG decoder 126. Specifically, the demultiplexing processing in demultiplexer 124 includes filtering to extract the required streaming from transport streamings (TS) having multiple AV streamings multiplexed in a multiplexer (MUX) on the transmitter side. When a channel is selected, a packet ID (PID) of an audio/video streaming included in the service of the channel is selected for the PMT of the channel. Thus, the receiver side filters the packet with the PID and extracts the audio/video streaming to provide the program.

A card reader interface (I/F) 131 is connected to demultiplexer 124. Card reader I/F 131 is used for loading a key stored in a conditional access module (CAM) 130 inserted in demultiplexer 124. CAM 130 includes an IC card with a self-contained CPU, a ROM and a RAM. Particularly, CAM 130 stores a key required for decryption together with a decryption program and performs descramble processing for providing a scrambled and transmitted signal, as for a pay-per-view broadcast, for example. Notably, the key is loaded from CAM 130 through card reader I/F 131 and is supplied to demultiplexer 124 so that the demultiplexer can decrypt the encrypted signal with the key.

The AV streaming extracted by demultiplexer 124 is conveyed to MPEG decoder 126. As required, MPEG decoder 126 stores the input digital signal in the self-contained DRAM, for example, and decodes the AV signal compressed by MPEG (especially, MPEG2).

Broadcast receiver 100 further includes an antenna 111 for receiving an analog broadcast and an analog tuner 161, an analog demodulator circuit 162 and an NTSC decoder 163 included in an analog tuner module. The analog tuner module outputs the AV signal of a program broadcasted in analog form. In this way, one of the AV signals received by digital tuner module 120 and AV signal converted to a predetermined form by the analog tuner module in broadcast receiver 100 is then selected through a switch SW1, is converted to a predetermined format through a format converter 127 and is output to and displayed on a flat panel display (FPD) 200 such as a plasma display or a liquid crystal display. Alternatively, the AV signal is output to an external analog device such as a CRT or a VCR as shown in FIG. 3 such that the signal can be recorded by the external device. Here, the AV signal converted to a predetermined form by MPEG decoder 126 is further converted to the NTSC format and is output through an NTSC encoder 128 or a D/A converter 129.

Broadcast receiver 100 further includes a central processor unit (CPU) 130. CPU 130 performs processing based on a program stored in a ROM 131. CPU 130 controls digital tuner 121, QPSK demodulator circuit 122, and error corrector circuit 123 included in digital tuner module 120 and analog tuner module 161, for example. Broadcast receiver 100 further includes an infrared (IR) transceiver portion 135 for generating or receiving an infrared ray control signal. CPU 130 outputs a predetermined control signal to another AV device through IR transceiver portion 135 or receives a control signal from another AV device.

A command can be directly input to CPU 130 by manipulating an operation button switch on a front panel 136 on the front face of broadcast receiver 100. Alternatively, a command can be input thereto by manipulating a button on a separately provided remote control 140. The input signal is sent 135 as an infrared ray to IR transceiver portion 135 from an IR emitter provided at the pointed end of the remote control 140. The input signal is input into CPU 130 so that a predetermined command can be input in CPU 130 by manipulating remote control 140.

In FIG. 3, broadcast receiver 100 further contains a hard disk drive 300 for recording program contents (AV information). AV signals decoded by MPEG decoder 126 are compressed by MPEG encoder 151 as digital signals and are then recorded on HDD 300 through an HDD processor circuit 152 that performs predetermined recording processing of the signals and records data. As indicated by the arrows in FIG. 3, the AV signal decoded by MPEG decoder 126 is directly input in HDD processor circuit 152. Furthermore, in order to read the information, which is recorded once, the compressed signal loaded from HDD 300 is input to MPEG decoder 126 again through HDD processor circuit 152. That is, decoding processing is performed on the AV signal: the decoded AV signal is converted to a predetermined format through format converter 127 and is either output to and played on flat panel display (FPD) 200 or output to an external device such as a VCR or a DVD recorder. FIG. 3 further shows a switch SW2 for selecting one of the AV signals output from the analog tuner module and the AV signals received through digital tuner module 120 and converted by MPEG decoder 126.

As shown in FIG. 3, broadcast receiver 100 further contains a digital information recorder, such as a DVD recorder 170, and the compressed signal loaded from HDD 300 can be recorded in a second DVD 171 inserted in DVD recorder 170 through HDD processor circuit 152. HDD processor circuit 152 includes a terminal for outputting a signal loaded from HDD 300 to an external digital recorder.

FIG. 3 further shows broadcast receiver 100 includes a power supply portion 400 for supplying required power to the above-described components. Power supply portion 400 converts alternate current power from a commercial power supply, not shown, to desired direct or alternate current power and supplies the driving power at least to HDD 300. Through press button switch 410, for example, power supply portion 400 turns the desired converted power to and from the components on and off. A plug 411 connects power supply portion 400 to a commercial power supply, as shown in the figure.

Figure 1:
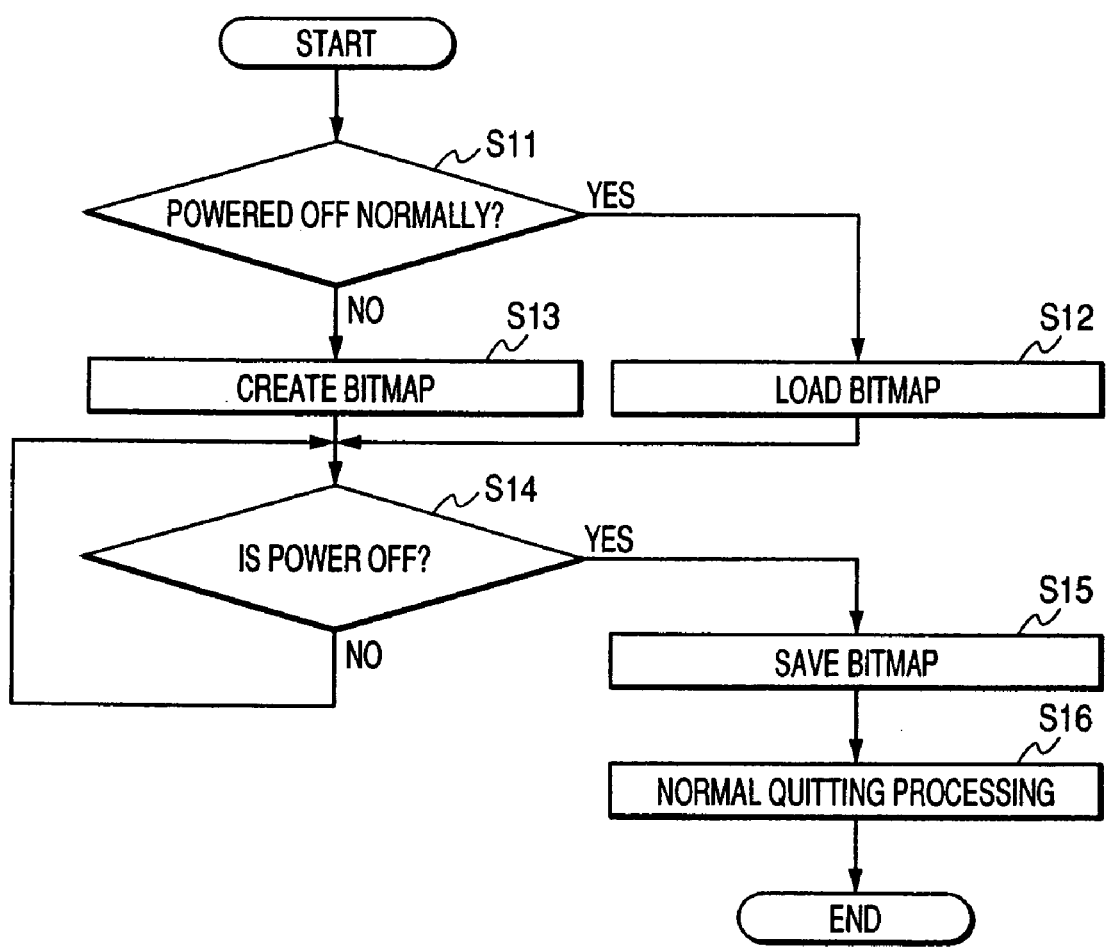
FIG. 1 is a flowchart describing an operation, upon startup, of a broadcast receiver according to an embodiment of the invention.

FIG. 1 shows an operation in broadcast receiver 100 having the above-described configuration according to the invention, specifically, an operation on startup of broadcast receiver 100, when power supply portion 400 is turned on. First, when power supply portion 400 of broadcast receiver 100 is turned on, whether or not power supply portion 400 was normally turned off in the last operation of broadcast receiver 100 is determined (step S11). If the power supply portion was turned off normally,("Yes" in FIG. 1), the bitmap information saved at normal shut-off is loaded (step S12), which will be described later. However, if the determination is that power supply portion 400 was not normally turned off in the last operation ("No" in FIG. 1), the bitmap information is newly created for HDD 300, the information recorder of broadcast receiver 100 (step S13).

Figure 2:
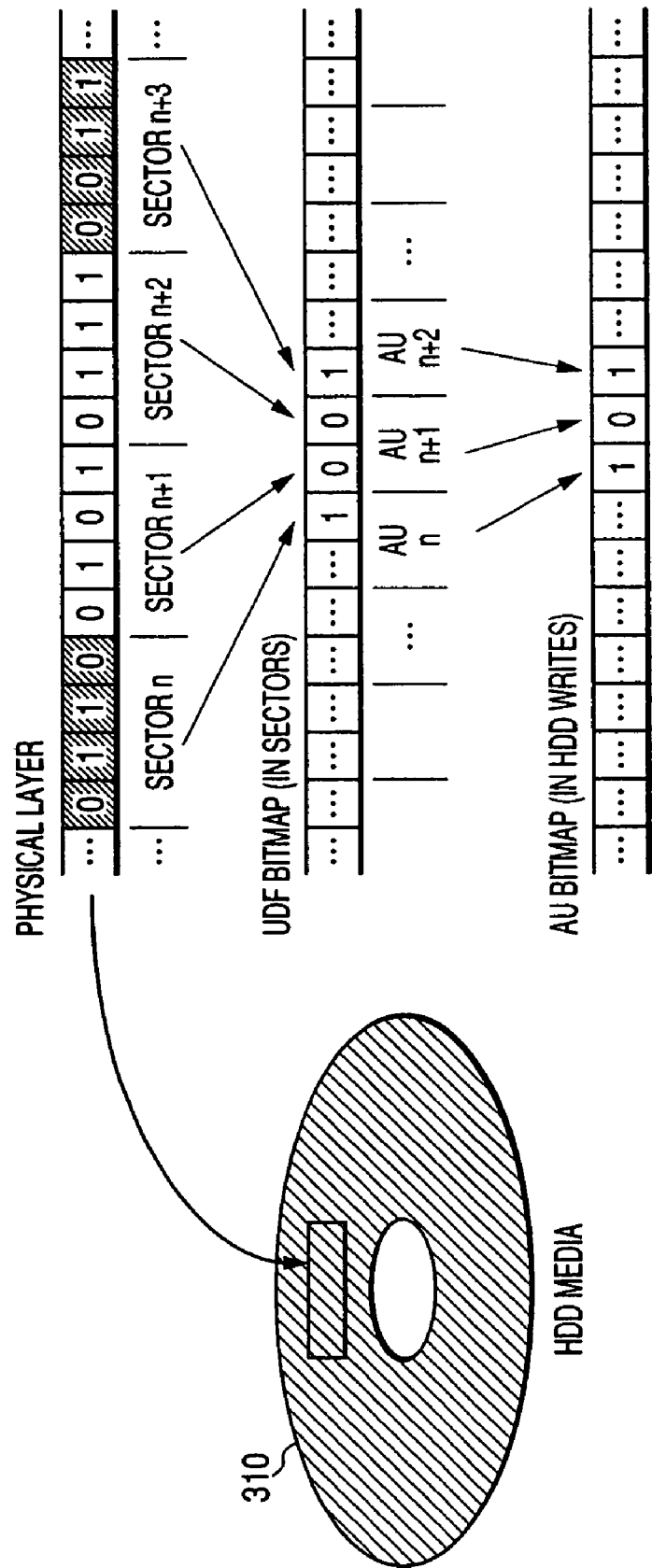
FIG. 2 is a diagram for explaining an operation for bitmap creation particularly among other operations upon start up of the broadcast receiver.

As shown in attached FIG. 2, HDD 300 then searches the surface of a disk 310 (an HDD information recording medium), for magnetic pickup, creates an UDF bitmap in sectors of 2K bytes, and further creates an AU bitmap in AUs, for example, a bitmap of 1980K bytes. The created bitmap information is used to calculate the vacant capacity of disk 310 so that writing/reading operations to/from the recording medium can be controlled in an optimum manner as is standard.

Then, broadcast receiver 100 determines whether power supply portion 400 was turned off (step S14). If the power supply portion was turned off, ("Yes" in FIG. 1), the bitmap information at that time is or saved in a flash memory or in a part of HDD 300 which is, for example, a volatile memory (step S15). The receiver then performs normal shut-down processing (step S16) and exits information processing. Here, the expression, "normal shut-down processing" refers to processing performed when a user normally turns off the switch of power supply portion 400, whereby the normal shut-off is also written in flash memory or in a part of HDD 300 with a signal of 1 bit, "1". Processing then ends.

As described above, on startup of broadcast receiver 100, when a user's shutting off the power supply portion results in normal shut-down of broadcast receiver 100, bitmap information is always saved (see step S15). Thereafter, normal shut-down processing records the signal indicating that broadcast receiver 100 turned off normally in nonvolatile memory. Thus, when the broadcast receiver is started again, the information recorded in the nonvolatile memory of broadcast receiver 100 is checked to determine whether power supply portion 400 was turned off in the last operation, as described with reference to step S11. Furthermore, since the bitmap information is always saved when broadcast receiver 100 normally shuts down, the bit map information may be loaded when the broadcast receiver is restarted in order to obtain the latest bitmap information in HDD 300.

In summary, when broadcast receiver 100 is normally shut down, normal shut-down processing records the most recent bitmap information and the normal shut-down signal in nonvolatile memory. When the broadcast receiver is started again, the normal shut-down signal is checked immediately, and the saved bitmap information may be loaded to obtain the latest bitmap information from HDD 300.

The broadcast receiver 100 may not always be turned off normally, for example because plug 411 connecting power supply portion 400 to a commercial power supply may have accidentally come off, or for another reason. Such an event may occur during determination of an abnormal power shut-off (see step S14 above). Thus the process goes to "No" in the flowchart shown in FIG. 1, and the routine of step S14 is performed again. In this case, broadcast receiver 100 shuts down without saving bitmap information in step S15 and the normal shut-down processing of step 16 is not done. Therefore, when broadcast receiver 100 is restarted, step S11 determines that power supply portion 400 was not turned off normally (resulting in "No" in FIG. 1, step 11.), and the bitmap information for HDD 300 is newly created in step S13.

In this way, the writing/reading operations to/from HDD 300 are controlled in an optimum manner on startup of broadcast receiver 100 using bitmap information saved if the last power shut-off was normally performed. In contrast, when the last power shut-off was not performed normally and, the latest bitmap information was not saved, the writing/reading operations are controlled in an optimum manner, on startup, by searching the recording area of HDD 300 and creating the latest bitmap information. Accordingly, the time-consuming operation for searching the recording area of HDD 300 can be skipped when the power supply portion was normally turned off, which decreases the time for starting broadcast receiver 100. Thus, a highly-operable broadcast receiver can be provided.

Figure 4A:
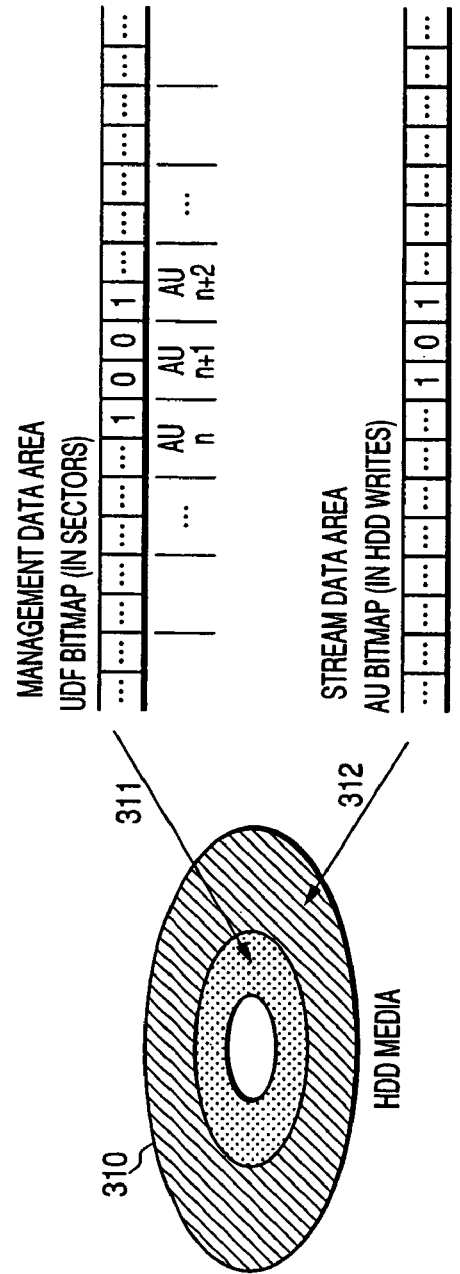
FIGS. 4A and 4B are diagrams specifically describing a hard disk drive provided for the information recording medium of a broadcast receiver according to another exemplary embodiment of the invention.
Figure 4B:
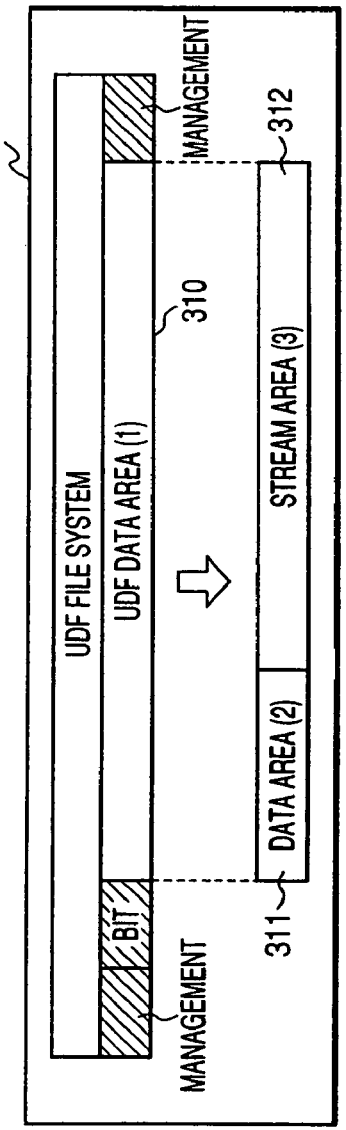

FIGS. 4A and 4B show another embodiment of the present invention, specifically, a variation of HDD 300, which is the broadcast receiver's information recording medium for recording received audio/video streaming data. In this example, HDD 300 has a recording area 310 divided into a management data area (or simply called "data area") 311 and a streaming data area (or simply called "streaming area") 312, each area of which is formatted in predetermined units of recorded information. More specifically, management data area 311 is preformatted in sectors of 2K bytes while streaming data area 312 is preformatted in AUs, for example, of 1980K bytes.

Here, the term, "streaming data", refers to a digitalized audio/video signal (data) obtained by broadcast receiver 100 while the term, "management data," refers to data other than streaming data, such as a thumbnail of a recorded program and information for determining whether the program was viewed after being recorded.

FIG. 4B shows the "UDF data area" in which "management data" and "streaming data" are conventionally recorded and managed in an overlapping manner in UDF file system 310, including HDD 300 divisions "data area" 311 and "streaming area" 312. Since the "streaming data" area generally has a much larger data capacity the "management data" area, efficient disk management can be achieved by storing and managing "data area" 311 and "streaming area" 312 in different areas on disk 310, as occurs with the present invention. FIG. 4B shows the inner part of a disk-shaped medium on the left side and the outer circumference on the right side with respect to the recording area on HDD medium 310. In FIG. 4B, "management" refers to an area for storing management information for managing an HDD included in UDF file system 310 while the term, "Bit", refers to an area for storing bitmap information. The "area division information", which is information in "data area" 311 and "streaming area" 312, is created in advance when UDF file system 310 is created by formatting HDD 300, and is recorded in the "management" area.

The bitmap creation processing of step S13 in FIG. 1 may, for example, include inputting area division information prerecorded in a part of HDD 300, searching "data area" 311 included in UDF file system 310, based on the area division information to create the bitmap and also searching "streaming area" 312 and creating the bitmap. The created bitmap information is stored in a flash memory, for example. The vacant capacity of the HDD 300 is obtained by calculating the vacant capacity based on the bitmap created in the conventional manner described above; thus, the detailed description is omitted here.

As described above, with HDD 300 as an information recorder in broadcast receiver 100, the searches, including the search for a vacant area on the HDD media 310, performed during bitmap creation (step S13), can be implemented more efficiently and quickly by performing the searches in different units, "streaming area" 312 storing "streaming data" and "data area" 311 storing "management data" significantly differing in data capacity. Thus, the writing/reading operations of the information recorded for broadcast receiver 100 can thereafter be managed in an optimum manner.

In the description above, "data area" 311 storing "management data" is located in an interior portion of HDD media 310 with respect to "streaming area" 312 storing "streaming data". Note that on startup (initializing) processing, the search for "data area" 311 is performed before that for "streaming area" 312. However, the invention is not limited only to this example; "data area" 311 may be on the outer circumference portion with respect to "streaming area" 312, and the search for the "data area" 311 is performed before that for "streaming area" 312.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A broadcast program recording method for receiving a broadcasted program and recording the received program on an information recording medium, the method comprising the steps of:
performing an operation for recording information on the information recording medium, which records the received program, based on bitmap information;
determining whether a power supply of the information recording medium was shut off normally last time or not when the information recording medium is powered on;
controlling the information recording medium using recorded bitmap information when the power supply was shut off normally last time; and
controlling the information recording medium by searching the recording area of the information recording medium and creating a latest bitmap information upon startup when the power supply was not shut off normally last time.

2. The broadcast program recording method according to claim 1, further comprising the steps of:
separating the broadcast program from image information and data information thereof; and
recording the image information and the data information in areas, which are different from each other, separately on the information recording medium.

3. A broadcast receiver, comprising:
a tuner portion for receiving a broadcasted program;
a received signal converter portion for converting a signal from the tuner portion to a predetermined format;
an information recording portion having an information recording medium for recording the signal converted by the received signal converter portion so that the broadcast receiver can record the received broadcast program in the information recording portion; and
a power supply portion connected to a commercial power supply for supplying required power to components including the information recording portion at least of the broadcast receiver,
wherein the recording operation on the information recording medium of the information recording portion is controlled based on bitmap information,
wherein the information recording portion determines whether a power supply thereof was shut off normally last time or not when the power supply is turned on;
wherein the information recording medium is controlled using recorded bitmap information when the power supply was shut off normally last time,
wherein the information recording medium is controlled by searching the recording area of the information recording medium and creating a latest bitmap information upon startup when the power supply was not shut off normally last time.

4. The broadcast receiver according to claim 3, wherein the information recording portion includes a hard disk.

5. The broadcast receiver according to claim 3, wherein the information recording portion further separates the broadcast program from image information and data information thereof and records the image information and the data information in areas, which are different from each other, separately on the information recording medium.

6. An information recorder being capable of recording a broadcast program, comprising:
a power supply portion connected to a commercial power supply for supplying required power to the information recorder,
wherein the recording operation on a recording medium of the information recorder is controlled based on bitmap information,
wherein the information recorder determines whether the power supply portion thereof was shut off normally last time or not when the power supply portion is turned on,
wherein the information recording medium is controlled using recorded bitmap information when the power supply was shut off normally last time,
wherein the information recording medium is controlled by searching the recording area of the information recording medium and creating a latest bitmap information upon startup when the power supply was not shut off normally last time.

7. The information recorder according to claim 6, further comprising a hard disk drive.

8. The information recorder according to claim 6, wherein the information recorder further separates the broadcast program from image information and data information thereof and records the image information and the data information in areas, which are different from each other, separately on the information recording medium.

* * * * *